(12) United States Patent
Lacondemine et al.

(10) Patent No.: US 9,435,890 B2
(45) Date of Patent: Sep. 6, 2016

(54) LASER ANEMOMETRY SYSTEM AND METHOD

(71) Applicant: THALES, Neuilly sur Seine (FR)

(72) Inventors: Xavier Lacondemine, Valence (FR); Nicolas Martin, Bourg les Valence (FR); Jean-Pierre Schlotterbeck, Rochefort-Samson (FR); Gregory Baral-Baron, Valence (FR)

(73) Assignee: Thales, Courbevoie (FR)

( * ) Notice: Subject to any disclaimer, the term of this patent is extended or adjusted under 35 U.S.C. 154(b) by 565 days.

(21) Appl. No.: 13/852,744

(22) Filed: Mar. 28, 2013

(65) Prior Publication Data

US 2016/0231348 A1  Aug. 11, 2016

(30) Foreign Application Priority Data

Mar. 29, 2012  (FR) ...................................... 12 00945

(51) Int. Cl.
| G01P 3/36 | (2006.01) |
|---|---|
| G01S 17/58 | (2006.01) |
| G01F 1/66 | (2006.01) |
| G01P 5/26 | (2006.01) |
| G01S 17/95 | (2006.01) |

(52) U.S. Cl.
CPC ............... *G01S 17/58* (2013.01); *G01F 1/663* (2013.01); *G01F 1/661* (2013.01); *G01P 5/26* (2013.01); *G01S 17/95* (2013.01)

(58) Field of Classification Search
USPC .......................... 356/28, 28.5, 5.01, 5.09, 27
See application file for complete search history.

(56) References Cited

U.S. PATENT DOCUMENTS

| 5,313,263 A * | 5/1994 | Abbiss ..................... G01S 17/50 356/28 |
| 6,608,669 B2 * | 8/2003 | Holton .................... G01S 17/58 356/28.5 |
| 2001/0009458 A1 * | 7/2001 | Asaka ................... G01S 7/4818 356/28.5 |
| 2003/0151732 A1 * | 8/2003 | Rogers ...................... G01P 5/26 356/28.5 |
| 2007/0229799 A1 * | 10/2007 | Baillon ..................... G01S 3/48 356/28.5 |
| 2009/0033911 A1 * | 2/2009 | Lacondemine ........... G01P 5/26 356/28 |
| 2010/0134780 A1 * | 6/2010 | Rodeau ..................... G01P 5/26 356/28.5 |
| 2010/0277714 A1 * | 11/2010 | Pedersen ............... G01S 7/4811 356/28 |
| 2011/0181863 A1 | 7/2011 | Renard et al. |

\* cited by examiner

*Primary Examiner* — Sang Nguyen
(74) *Attorney, Agent, or Firm* — Michael J. Donohue; Davis Wright Tremaine LLP

(57) ABSTRACT

An anemometry system comprising a laser source supplying an incident beam that is backscattered by passing through the incident beam mixing means for mixing the backscattered beam and a reference beam, creating an interferometry wave conversion means, converting the interferometry wave into an electrical signal proportional to the power of said wave first determination means, for determining a time-frequency diagram of said electrical signal. The system also comprises second determination means for determining spots of said diagram, each spot being a set of connected points of said diagram, having exceeded a detection threshold computation means for computing an average of the frequency, a duration and a slope characterizing the trend of the frequency as a function of time in the time-frequency diagram, and determination means 107 for determining the air speed from all or part of said averages of the frequency, said durations and said slopes.

14 Claims, 3 Drawing Sheets

LASER ANEMOMETRY SYSTEM AND METHOD

Figure 1:
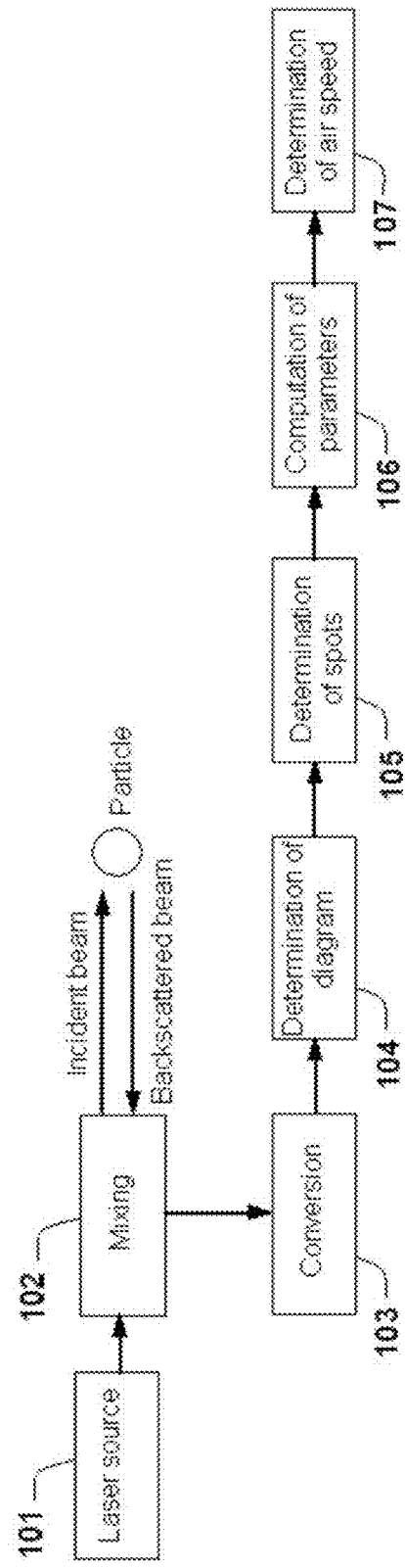

The present invention relates to a laser anemometry device. It applies in particular to the computation of the speed of an aircraft relative to the surrounding air, also called air speed. This computation is performed by determining the speed of the surrounding particles and naturally present in the atmosphere.

Laser anemometry systems that use the backscattering of a Gaussian laser beam on the particles surrounding the system to detect the air speed of an aircraft are known. These systems present a laser beam whose focal point is spatially highly localized and they are designed to detect only the presence of particles passing through said focal point. This technical feature makes it possible to obtain an accurate local air speed measurement even when the air surrounding the aircraft exhibits a speed gradient. These systems present two drawbacks which emerge in particular conditions of seeding of the air with particles.

The first is the possibility of detecting large particles, because of their high backscattering section, even if they do not pass through the focal point. In this case, the measurements can be falsified by virtue of the speed gradient and of the inherent inertia of the large particles.

The second drawback is an unavailability of speed information when no detectable particle passes through the focal point of the laser beam.

The present invention notably aims to remedy these problems by using a set of processing operations applied to the measurements of the backscattered beams in order to obtain the speed that would be expected of a virtual particle passing through the focal point of the laser beam.

According to one aspect of the invention, a laser anemometry system is proposed which comprises a set of at least one coherent laser source 101 supplying an incident beam, said beam being backscattered by a set of particles passing through said incident beam. The system also comprises mixing means 102, respectively associated with a laser source, for mixing said backscattered beam and a reference beam, said reference beam being the duplication of said incident beam, creating an interferometry wave. The system further comprises conversion means 103, respectively associated with a laser source, converting said wave into an electrical signal, the instantaneous intensity of which is proportional to the instantaneous power of said wave and first determination means 104, respectively associated with a laser source, for determining a time-frequency diagram of said electrical signal. Finally, the system comprises second determination means 105, respectively associated with a laser source, for determining spots of said diagram, each spot being a set of connected points of said diagram, having exceeded a detection threshold, computation means 106, respectively associated with a laser source, for computing an average of the frequency, a duration and a slope characterizing the trend of the frequency as a function of time in the time-frequency diagram, respectively associated with a spot, and third determination means 107 for determining the air speed from all or part of said averages of the frequency, said durations and said slopes. Furthermore, the third determination means 107 for determining the air speed are suitable for computing a Doppler frequency, said Doppler frequency being the average of all or part of said averages of the frequency respectively associated with spots for which one of the following conditions is met:

said duration is less than a first duration threshold,
the multiplication of said duration by said slope is less than a second threshold,
said multiplication of said slope by the square of said duration is less than a third threshold.

In the case where the time-frequency diagram used corresponds to a spectrogram of the electrical signal, the detection threshold is typically between 8 and 14 dB, with 12 dB as the preferred value. The reference level (0 dB) is the average level expected in the absence of particles.

This device therefore makes it possible to determine the speed of the aircraft, based on the set of particles intersecting the laser beam. It is also possible to use the device even when no particle passes through the focal point of the laser.

The fact that one of the following three conditions is met:
said duration is less than a first duration threshold,
the multiplication of said duration by said slope is less than a second threshold,
said multiplication of said slope by the square of said duration is less than a third threshold,
makes it possible to determine that the particle is a particle that has intersected the laser beam at a distance from the focal point (or distance from the "waist") less than a distance threshold (typically $z_{max}=z_r=5$ mm for a Gaussian beam with a radius at the focal point equal to $\omega_0=50$ μm).

For this, use is made of the relationships between the distance from the focal point (that is to say the coordinate $z_0$, referenced relative to the focal point, at which the particle intersects the beam) and the characteristics of duration, slope and frequency variation of the corresponding spot in the time-frequency diagram:

$$\text{duration} = \frac{2 \cdot \omega(z_0)}{V_{trans}} = \frac{2 \cdot \omega_0 \cdot \sqrt{z_0^2 + z_R^2}}{V_{trans} \cdot z_R}$$

$$\text{slope} = \frac{2 \cdot V_{trans}^2}{\lambda \cdot z_0 \cdot \left[1 + \left(\frac{z_R}{z_0}\right)^2\right]}$$

$$\Delta f = \text{slope. duration} = \frac{4 \cdot \omega_0 \cdot V_{trans}}{\lambda \cdot z_R \cdot \sqrt{1 + \left(\frac{z_R}{z_0}\right)^2}}$$

with, by definition, $z_R = \frac{\pi \cdot \omega_0^2}{\lambda}$ and knowing that the radius of the Gaussian laser beam at the coordinate z has the value $$\omega(z) = \omega_0 \sqrt{1 + \left(\frac{z}{z_R}\right)^2}$$

$V_{trans}$ is defined as the projection of the speed of the particle concerned in the plane orthogonal to the axis of the laser beam,
λ is the wavelength of the laser.

Different methods can be used to select the particles intersecting the beam in proximity to the focal point:

A first method consists in selecting the spots for which the duration is less than a duration threshold estimated by taking into account the estimation of the transversal speed $V_{trans}$ from the Doppler speed and an assumed orientation of the speed of the particle relative to the beam. In practice, the relationship linking the distance from the focal point (or absolute value of the coordinate $z_0$) to the duration is strictly increasing such that the selection of the particles for which $|z_0|<z_{max}$ is equivalent to the selection of the particles for which $$duration < duration(z_{max}) = \frac{2 \cdot \omega_0 \cdot \sqrt{z_{max}^2 + z_R^2}}{V_{trans} \cdot z_R}.$$

The first duration threshold is deduced from the equation $$first\_duration\_threshold = \frac{2 \cdot \omega_0 \cdot \sqrt{z_{max}^2 + z_R^2}}{V_{trans} \cdot z_R}, \text{ or}$$

$$first\_duration\_threshold = \frac{2\sqrt{2} \cdot \omega_0}{V_{trans}}$$

by considering $z_{max}=z_r$. This threshold will thus have the value 1.4 µs for $\omega_0=50$ µm and $V_{trans}=100$ m/s.

A second method consists in selecting the spots for which the frequency variation $\Delta f=$duration.slope is less, as an absolute value, than a frequency variation threshold estimated by taking into account the estimation of the transversal speed $V_{trans}$ from the Doppler speed and an assumed orientation of the speed of the particle relative to the beam, the orientation of the speed of the particle relative to the laser beam can, for example, be estimated from the orientation of the air speed vector relative to the measurement axis and a possible local aerodynamic field compensation term).

In practice, the relationship linking the distance from the focal point to the absolute value of the frequency variation is strictly increasing. Selecting the particles such that $|z_0|<z_{max}$ is therefore equivalent to selecting the spots for which $$|\Delta f| < \Delta f(z_{max}) = \frac{4 \cdot V_{trans}}{\pi \cdot \omega_0 \cdot \sqrt{1 + \left(\frac{z_R}{z_{max}}\right)^2}}.$$

The second frequency variation threshold is deduced from the equation $$second\_threshold\_\Delta s = \frac{4 \cdot V_{trans}}{\pi \cdot \omega_0 \cdot \sqrt{1 + \left(\frac{z_R}{z_{max}}\right)^2}}, \text{ or}$$

$$second\_threshold\_\Delta s = \frac{4 \cdot V_{trans}}{\pi \cdot \omega_0 \cdot \sqrt{2}}$$

by considering $z_{max}=z_r$. It will thus have the approximate value 1.8 MHz for $\omega_0=50$ µm and $V_{trans}=100$ m/s.

A third method consists in selecting the particles for which $z_0<z_{max}$, the coordinate $z_0$ of the particle being estimated for each spot detected, from the following equation (which results from a combination of the preceding equations) which offers the benefit of not requiring any assumed orientation of the speed of the particle relative to the beam.

$$z_0 = \frac{slope \cdot duration^2 \cdot \lambda \cdot z_R^2}{8 \cdot \omega_0^2} \text{ or even}$$

$$z_0 = \frac{slope \cdot duration^2 \cdot \pi^2 \cdot \omega_0^2}{8 \cdot \lambda}.$$

Having estimated $z_0$ from the preceding equation, the thresholding consists in selecting the particles for which $|z_0|<z_{max}$ with, for example, $z_{max}=z_r$. This also amounts to selecting the particles for which:

$$slope \cdot duration^2 < third\_threshold \cdot slope \cdot duration^2 = \frac{8 \cdot \lambda \cdot z_{max}}{\pi^2 \cdot \omega_0^2},$$

or, by considering $z_{max}=z_r$, $$third\_threshold \, slope \cdot duration^2 = \frac{8}{\pi}$$

or even $third\_threshold \, \Delta f \cdot duration = \frac{8}{\pi}.$

This third threshold is computed from the following equation $$third\_threshold \, slope \cdot duration^2 = \frac{8 \cdot \lambda \cdot z_{max}}{\pi^2 \cdot \omega_0^2}$$

in which $\lambda$ represents the wavelength of the laser, $\omega 0$ represents the radius of the beam at its focal point, zmax corresponds to the maximum distance to the focal point as a function of the desired spatial selectivity.

This technical feature therefore makes it possible to improve the accuracy of the laser anemometer by using only the speed information provided by the particles that are most representative of the air speed.

According to one embodiment, the third determination means 107 for determining the air speed are suitable for determining parameters of a theoretical curve, such that the points of a graph, of which the first axis represents a frequency and the second axis represents either a slope or a frequency variation, and containing a set of points, each point being respectively associated with one of said spots and each point having as coordinates, according to the first and the second axis respectively, the average of the frequency and the slope or the frequency variation of said spot, converge the most with said curve and the determination a Doppler frequency, said Doppler frequency corresponding to a singularity on said theoretical curve.

A singularity of the curve slope=g(f) or of the curve $\Delta f=g(f)$ should be understood to mean a very characteristic point which corresponds both to the zero crossing of the curve and to a steep slope of the curve.

According to one embodiment, the third determination means for determining the air speed are suitable for determining said Doppler frequency by the use of a linear regression from said graph.

According to one embodiment, the third determination means 107 for determining the air speed are suitable for determining said Doppler frequency by correlation between said theoretical curve and said graph.

These two features offer the advantage of being able to improve the air speed determination performance levels in particular atmospheric conditions for which no particle is detected at the focal point.

According to one embodiment, the computation means 106 are suitable for using the following relationships:

$$P_b(f,t) = P_u(f,t) \Big/ \iint_{spot} P_u(f,t) f \; t \, df \, dt$$

$$m_t = \iint_{spot} P_u(f,t) t \, df \, dt$$

$$m_f = \iint_{spot} P_u(f,t) f \, df \, dt$$

$$\sigma_t^2 = \iint_{spot} P_u(f,t) t^2 \, df \, dt - m_t^2$$

$$\rho_{t,f} = \iint_{spot} P_u(f,t) t \, f \, df \, dt - m_t m_f$$

$$\text{slope} = \frac{\rho_{t,f}}{\sigma_t^2}$$

$$\text{duration} = 4\sqrt{2} \; \sigma_t$$

in which spot is the set of points of one of said spots, $P_u(f,t)$ is the value of the time-frequency graph for the frequency f and the time t, $m_f$ is the average of the frequency of said spot, slope is the slope of said spot and duration is the duration of said spot.

This technical feature makes it possible to improve the computation of the slope of the spots and thus improve the accuracy of the determination of the air speed.

According to one embodiment, said computation means 106 are suitable for determining the slope of one of said spots by using a linear regression on said spot.

This technical feature makes it possible to improve the computation of the slope of the spots and thus improve the accuracy of the determination of the air speed.

Advantageously, the laser anemometry method comprises the following steps:
 a step of transmission of an incident beam by at least one coherent laser source, said beam being backscattered by a set of particles passing through said incident beam,
 a mixing step, respectively associated with a laser source, for mixing said backscattered beam and a reference beam, said reference beam being the duplication of said incident beam, creating an interferometry wave,
 a conversion step, respectively associated with a laser source, converting said wave into an electrical signal, the instantaneous intensity of which is proportional to the instantaneous power of said wave,
 a first determination step, respectively associated with a laser source, for determining a time-frequency diagram of said electrical signal.

Furthermore, it also comprises the following steps:
 a second determination step, respectively associated with a laser source, for determining spots of said diagram, each spot being a set of connected points of said diagram, that have exceeded a detection threshold,
 a computation step, respectively associated with a laser source, for computing an average of the frequency, a duration and a slope, respectively associated with a spot,
 a third determination step for determining the air speed from all or part of said averages of the frequency, of said durations and of said slopes. Furthermore, the third determination step 107 for determining the air speed is suitable for computing a Doppler frequency, said Doppler frequency being the average of all or part of said averages of the frequency respectively associated with spots for which one of the following conditions is met:
 said duration is less than a first duration threshold,
 the multiplication of said duration by said slope is less than a second threshold,
 said multiplication of said slope by the square of said duration is less than a third threshold.

Figure 2:
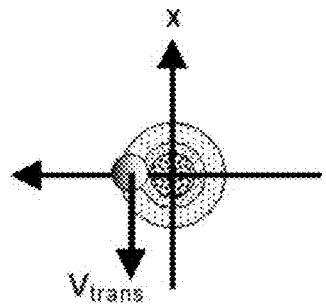
Figure 3:
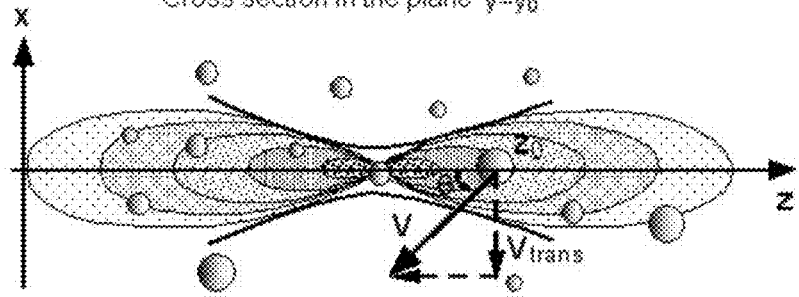
Figure 4:
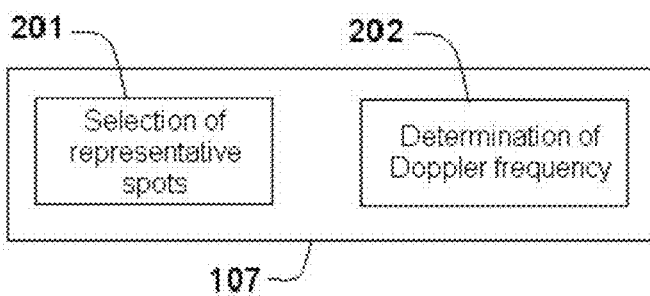
Figure 5:
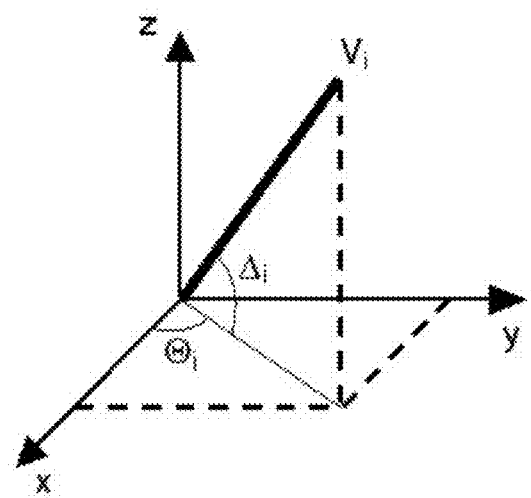
Figure 6:
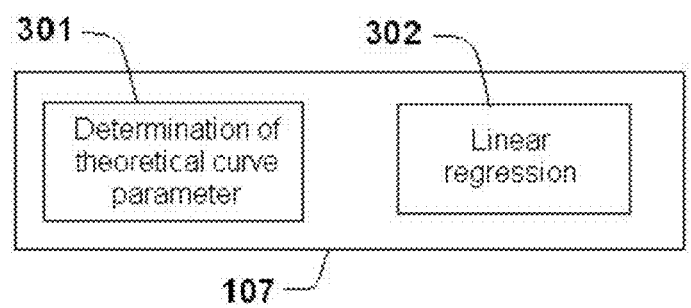
Figure 7:
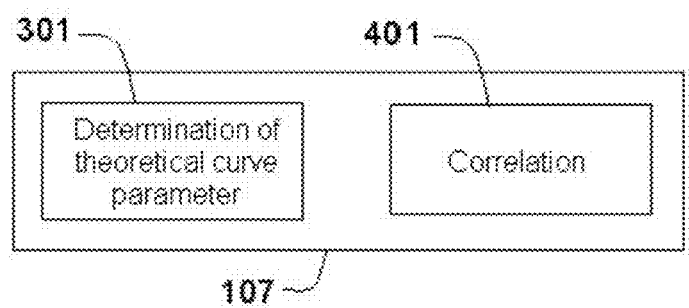

The invention will be better understood and other advantages will become apparent on reading the detailed description, given as a nonlimiting example, and with the use of the figures in which:

FIG. 1 presents a first embodiment of the device according to one aspect of the invention FIG. 2 presents the instant for which the distance, between the particle concerned and the measurement axis, is minimum according to a cross section in the plane $z=z_0$ FIG. 3 presents the instant for which the distance, between the particle concerned and the measurement axis, is minimum according to a cross section in the plane $y=y_0$ FIG. 4 presents a first embodiment of the module 107 for determining the air speed FIG. 5 presents the location of the angles of the different laser sources FIG. 6 presents a second embodiment of the module 107 for determining the air speed FIG. 7 presents a third embodiment of the module 107 for determining the air speed.

The present invention relates to a laser anemometry device. This invention is of interest in the context of air travel in order to accurately know the speed of an aircraft relative to the air mass surrounding that aircraft.

The device as presented in FIG. 1 comprises a coherent laser source 101 transmitting an incident laser beam. This laser beam has a focal point. In their movement, particles intersect the laser beam. These particles then provoke a backscattering of the laser beam. The device comprises a mixing module 102 for mixing the backscattered beam and a reference beam. This reference beam is the duplication of the incident beam, this mixing module creates an interferometry wave. A conversion module 103 then makes it possible to convert the interferometry wave into an electrical signal, the instantaneous power of which is proportional to the instantaneous power of the interferometry wave and the average frequency of which is proportional to the projection of the speed of the particle along the axis of the laser beam.

The amplitude of the electrical signal s(t) resulting from the passage into the beam of a particle driven at a speed V is expressed thus:

$$s(t) = 2S\sqrt{P_{OL}P_{SR}} \cdot \exp\left(-\frac{2 \cdot V_{trans}^2 \cdot (t-t_0)^2}{\omega^2(z)}\right) \cdot$$

$$\cos\left(2\pi \cdot \left(\frac{2}{\lambda} V_{long} \cdot (t-t_0) + \frac{2 \cdot V_{trans}^2 \cdot}{\lambda \cdot z_0 \left[1 + \left(\frac{z_R}{z_0}\right)^2\right]} \cdot \frac{(t-t_0)^2}{2}\right) + \Phi_0\right)$$

in which:
S is the sensitivity of the detector
$P_{OL}$ is the local oscillator power
$P_{SR}$ is the power of the backscattered signal coupled in the fibre:

$$P_{sr} = \frac{4 \cdot \lambda^2 \cdot P_e \cdot S_{eff}}{\pi^2 \omega^4(z_0)} \cdot \exp\left(-\frac{4y_0^2}{\omega^2(z_0)}\right)$$

$\lambda$ is the wavelength of the laser
$P_e$ is the transmitted laser power
$S_{eff}$ is the effective backscattering section of the particle at the wavelength concerned
$\omega(z)$ is the radius of the Gaussian laser beam defined by $$\omega(z) = \omega_0 \sqrt{1 + \left(\frac{z}{z_R}\right)^2}$$

$\omega_0$ is the radius of the Gaussian laser beam at the focal point (waist)
$V_{trans}$ is defined as the projection of the speed of the particle concerned in the plane orthogonal to the axis of the laser beam
$V_{long}$ is the projection of the speed V of the particle concerned on the axis of the beam such that $V_{long}^2 + V_{trans}^2 = V$
The term $$\frac{2}{\lambda} V_{long}$$

corresponds to the Doppler frequency
The instant $t_0$ is the instant for which the distance to the particle concerned to the measurement axis is minimum, as illustrated in FIG. 2 showing a cross section in the plane $z=z_0$ and in FIG. 3 showing a cross section in the plane $y=y_0$.

A module 104 makes it possible to determine a time-frequency diagram of the electrical signal. This diagram is produced by typically using a time window of Gaussian form and of a length aligned on the expected duration of the spots given the speed and the diameter of the beam. These parameters are also dependent on conditions of installation of the anemometer on the carrier.

For a waist radius: $\omega_0 = 50$ μm, the range of variation of the duration of the signal will be of the order of 200 ns to 20 μs.

This diagram presents a set of spots corresponding to the passages of the different particles in front of the incident beam. A module 105 is used to separate and locate each spot. A spot consists of a set of connected points of the time-frequency diagram that have exceeded a certain fixed threshold typically lying within the interval [8;14 dB] with 12 dB as the preferred value in the case where the time-frequency diagram corresponds to the spectrogram of the electrical signal, the reference level 0 dB corresponding to the average level expected in the absence of particles. For all or part of the spots, a computation module 106 is used to compute the average of the frequencies of the points of the spot and also to compute the slope of the spots, as well as their duration and their frequency variation. This slope represents the trend of the frequency as a function of time in the time-frequency diagram. These parameters can in particular be obtained by the following relationships:

$$P_b(f,t) = P_u(f,t) \bigg/ \iint_{spot} P_u(f,t) f \, t \, df \, dt$$

-continued $$m_t = \iint_{spot} P_u(f,t) t \, df \, dt$$

$$m_f = \iint_{spot} P_u(f,t) f \, df \, dt$$

$$\sigma_t^2 = \iint_{spot} P_u(f,t) t^2 \, df \, dt - m_t^2$$

$$\rho_{t,f} = \iint_{spot} P_u(f,t) t \, f \, df \, dt - m_t m_f$$

$$\text{slope} = \frac{\rho_{t,f}}{\sigma_t^2}$$

$$\text{duration} = 4\sqrt{2}\,\sigma_t$$

in which spot is the set of points of one of said spots, $P_u(f,t)$ is the value of the time-frequency graph for the frequency f and the time, t, $m_f$ is the average of the frequency of said spot, slope is the slope of said spot and duration the duration of said spot.

A module 107 is used to determine the air speed of the system from all or part of the average of the frequencies, the slopes and the durations computed by the module 106. It can, for example, determine a Doppler frequency corresponding to the average of all or part of the averages of the frequency associated respectively with a spot. Finally, the air speed is computed from the Doppler frequency by relationships known to the person skilled in the art.

These different modules can be produced on one or more generic processors coupled to memory making it possible to save the intermediate data, but also on dedicated processors, programmable logic arrays of FPGA or PLD type, or any other type of device making it possible to perform the determinations described, the different modules being able to share the computation and memory resources.

FIG. 4 presents an embodiment in which the module 107 for determining the air speed comprises two submodules. The first submodule 201 is used to select the spots most representative of the speed at the focal point. This selection is made as a function of the duration and the slope of each spot. The spots selected are the spots for which one of the following conditions is met:
  said duration is less than a first duration threshold,
  the multiplication of said duration by said slope is less than a second threshold,
  said multiplication of said slope by the square of said duration is less than a third threshold.

The verification of one of the preceding three conditions makes it possible to determine that the particle is a particle that has intersected the laser beam at a distance to the focal point (or distance to the waist) less than a distance threshold (typically $z_{max} = z_r = 5$ mm for a Gaussian beam with a radius of the focal point equal to $\omega_0 = 50$ μm).

The relationships used for this are the relationships between the distance to the focal point (that is to say the coordinate $z_0$, referenced relative to the focal point, at which the particle intersects the beam) and the characteristics of duration, slope and frequency variation of the corresponding spot in the time-frequency diagram:

$$\text{duration} = \frac{2 \cdot \omega(z_0)}{V_{trans}} = \frac{2 \cdot \omega_0 \cdot \sqrt{z_0^2 + z_R^2}}{V_{trans} \cdot z_R}$$

-continued $$\text{slope} = \frac{2 \cdot V_{trans}^2}{\lambda \cdot z_0 \cdot \left[1 + \left(\frac{z_R}{z_0}\right)^2\right]}$$

$$\Delta f = \text{slope} \cdot \text{duration} = \frac{4 \cdot \omega_0 \cdot V_{trans}}{\lambda \cdot z_R \cdot \sqrt{1 + \left(\frac{z_R}{z_0}\right)^2}}$$

with, by definition, $z_R = \dfrac{\pi \cdot \omega_0^2}{\lambda}$ and knowing that the radius of the Gaussian laser beam at the coordinate z has the value $$\omega(z) = \omega_0 \sqrt{1 + \left(\frac{z}{z_R}\right)^2}$$

$V_{trans}$ is defined as the projection of the speed of the particle concerned in the plane orthogonal to the axis of the laser beam, $\lambda$ is the wavelength of the laser.

Various methods can be used to select the particles intersecting the beam in proximity to the focal point:

A first method consists in selecting the spots for which the duration is less than a duration threshold estimated by taking into account the estimation of the transversal speed $V_{trans}$ from the Doppler speed and an assumed orientation of the speed of the particle relative to the beam.

The first duration threshold is deduced from the equation $$\text{first\_duration\_threshold} = \frac{2 \cdot \omega_0 \cdot \sqrt{z_{max}^2 + z_R^2}}{V_{trans} \cdot z_R}, \text{ or}$$

$$\text{first\_duration\_threshold} = \frac{2\sqrt{2} \cdot \omega_0}{V_{trans}},$$

by considering $z_{max} = z_r$. This threshold will thus have the value 1.4 µs for $\omega_0 = 50$ µm and $V_{trans} = 100$ m/s.

A second method consists in selecting the spots for which the frequency variation $\Delta f = \text{duration.slope}$ is less, as an absolute value, than a frequency variation threshold estimated by taking into account the estimation of the transversal speed $V_{trans}$ from the Doppler speed and an assumed orientation of the speed of the particle relative to the beam, the orientation of the speed of the particle relative to the laser beam can, for example, be estimated from the orientation of the air speed vector relative to the measurement axis and a possible local aerodynamic field compensation term).

The second frequency variation threshold is deduced from the equation $$\text{second\_threshold\_}\Delta f = \frac{4 \cdot V_{trans}}{\pi \cdot \omega_0 \cdot \sqrt{1 + \left(\frac{z_R}{z_{max}}\right)^2}}, \text{ or}$$

$$\text{second\_threshold\_}\Delta f = \frac{4 \cdot V_{trans}}{\pi \cdot \omega_0 \cdot \sqrt{2}},$$

by considering $z_{max} = z_r$. It will thus have the approximate value 1.8 MHz for $\omega_0 = 50$ µm and $V_{trans} = 100$ m/s.

A third method consists in selecting the particles for which $z_0 < z_{max}$, the coordinate $z_0$ of the particle being computed for each spot detected, from the following equation (which results from a combination of the preceding equations) which offers the benefit of not requiring any assumed orientation of the speed of the particle relative to the beam.

$$z_0 = \frac{\text{slope} \cdot \text{duration}^2 \cdot \lambda \cdot z_R^2}{8 \cdot \omega_0^2}$$

$$\text{or even } z_0 = \frac{\text{slope} \cdot \text{duration}^2 \cdot \pi^2 \cdot \omega_0^2}{8 \cdot \lambda}$$

Having estimated $z_0$ from the preceding equation, the thresholding consists in selecting the particles for which $|z_0| < z_{max}$ with, for example, $z_{max} = z_r$. This also amounts to selecting the particles for which $$\text{third\_threshold slope} \cdot \text{duration}^2 < \frac{8 \cdot \lambda \cdot z_{max}}{\pi^2 \cdot \omega_0^2},$$

or, by considering $z_{max} = z_r$, $$\text{third\_threshold slope} \cdot \text{duration}^2 < \frac{8}{\pi}$$

or even $$\text{third\_threshold } \Delta f \cdot \text{duration} < \frac{8}{\pi}.$$

Then, a Doppler frequency is determined by the submodule 202. This Doppler frequency corresponds to the average of the average frequencies supplied by the module 106 for the spots previously selected by the submodule 201. Finally, the air speed is computed from the Doppler frequency by relationships known to the person skilled in the art. Thus, for each measurement axis, the speed along that axis is computed from the corresponding Doppler frequency using the following relationship:

$$V_{axis\_i} = \frac{\lambda}{2} F_{Doppler\_i}.$$

The 3 components of the air speed vector are deduced from the N measurements (where N≤3 is the number of measurement axes, that is to say non-coplanar laser beams, used) by a matrix computation resulting from the application of an algorithm of least squares type.

If H is the observation matrix defining the orientation of the measurement axes in the coordinate system linked to the carrier $$H = \begin{bmatrix} \cos\Theta_1 \cdot \cos\Delta_1 & \sin\Theta_1 \cdot \cos\Delta_1 & \sin\Delta_1 \\ \cos\Theta_2 \cdot \cos\Delta_2 & \sin\Theta_2 \cdot \cos\Delta_2 & \sin\Delta_2 \\ \dots & \dots & \dots \\ \cos\Theta_N \cdot \cos\Delta_N & \sin\Theta_N \cdot \cos\Delta_N & \sin\Delta_N \end{bmatrix}$$

The location of the different angles is presented in FIG. 5.

$$\begin{bmatrix} V_X \\ V_Y \\ V_Z \end{bmatrix} = [H^T \cdot H]^{-1} \cdot H^T \cdot \begin{bmatrix} V_1 \\ V_2 \\ \ldots \\ V_N \end{bmatrix}$$

and the air speed is defined by its modulus TAS = $\sqrt{V_X^2 + V_Y^2 + V_Z^2}$ and the angles of incidence $$AOA = \arctan\left(\frac{V_Z}{V_X}\right),$$

and of side slip $$SSA = \arctan\left(\cos AOA \cdot \frac{V_Y}{V_X}\right).$$

FIG. 6 presents another embodiment of the system in which the module for determining the air speed 107 comprises two submodules. The first submodule 301 is used to determine the parameters of a theoretical curve in order for this theoretical curve to converge closest to the points of the time-frequency diagram. This determination is made by linear regression. A second submodule 302 is used to determine a singularity in said theoretical curve and the frequency of this singularity corresponds to the Doppler frequency representing the air speed of the system and for which the theoretical curve exhibits a singularity.

The submodule 301 for determining parameters by linear regression uses at least one of the theoretical relationships linking the slope and duration characteristics with the coordinate $z_0$ of the point of intersection of the particle and of the laser beam, as defined in the following equation:

$$\text{slope} = \frac{2 \cdot V_{trans}^2}{\lambda \cdot z \cdot \left[1 + \left(\frac{z_R}{z}\right)^2\right]} \text{ and duration} = \frac{2 \cdot \omega_0 \cdot \sqrt{z_0^2 + z_R^2}}{V_{trans} \cdot z_R}.$$

In these relationships, $z_0$ represents the distance between the focal point of the incident beam and the point at which the particle intersects the incident beam, $\lambda$ is a parameter of the system, $V_{trans}$ is the projection of the speed of the particle concerned in the plane orthogonal to the axis of the laser beam and $z_R$ has the value $$z_R = \frac{\pi \cdot \omega_0^2}{\lambda}$$

in which $\omega_0$, the radius of the beam at the focal point, is a parameter of the system which characterizes the length of the focal area.

This submodule also uses different parametric models representing the relationship between z, the distance between the focal point of the incident beam and the point at which the particle intersects the incident beam, and $f_d$, the Doppler frequency of the beam backscattered by the particle. The parametric models are, for example:

$z = a + bf_d$, $z = a + bf_d + cf_d^2$ or $f_d = \alpha + \beta z + \gamma z^2$.

The linear regression method will make it possible to compute the parameters a, b and c of the different parametric models.

In the case of the use of the parametric model $z = a + bf_d$

Each spot i is characterized by the average of the frequencies $f_i$ of the points of the spot, the slope $\text{slope}_i$ and the duration $\text{duration}_i$ of said spot and the distance $z_i$ of the passage of the particle (corresponding to this spot) relative to the focal point. The value of $z_i$ is obtained by one of the following four relationships:

Solved by duration $$z_i^2 = \left(\frac{\text{duration}_i \cdot V_{trans} \cdot z_R \cdot}{2 \cdot \omega_0}\right)^2 - z_R^2$$

Solved by frequency variation $$z_i^2 = \frac{(\lambda \cdot z_R^2 \cdot \Delta f)^2}{(4 \cdot \omega_0 \cdot V_{trans})^2 - (\lambda \cdot z_R \cdot \Delta f)^2}$$

Solved by slope $$z_i = -\frac{V_{trans}^2 \pm \sqrt{V_{trans}^4 - \rho_i^2 \cdot \lambda^2}}{\rho_i \cdot \lambda}$$

Solved by slope and duration (with no assumed transversal speed $V_{trans}$)

$$z_i = \frac{\text{slope}_i \cdot \text{duration}_i^2 \cdot \pi^2 \cdot \omega_0^2}{8 \cdot \lambda}.$$

In order to stabilize the computation, a quality factor can be associated with each spot to take account of the inaccuracy as to the determination of the duration and/or of the slope in the computation of z.

In order to perform the linear regression, making it possible to obtain the coefficients a and b of a straight line of equation $z = a + bf_d$, the matrix representation $Z = F.X$ is used. In this representation:

$$Z = \begin{bmatrix} z_1 \\ z_2 \\ \vdots \\ z_N \end{bmatrix}, F = \begin{bmatrix} 1 & f_1 \\ 1 & f_2 \\ \vdots & \vdots \\ 1 & f_N \end{bmatrix} \text{ and } X = [\, a \;\; b \,].$$

The estimation of the value of the vector X is obtained by a linear regression performed over N spots. The weighted least squares method is used and, to avoid giving too much weight to the noise-affected values, the matrix W is introduced:

$$W = \begin{bmatrix} r_1 & 0 & .. & 0 \\ 0 & r_2 & 0 & : \\ : & 0 & \cdot & 0 \\ 0 & .. & 0 & r_N \end{bmatrix}$$

By using the weighted least squares method, it is then found that the estimation of the value of the vector X has the value:

$$\hat{X} = (F^t W^t W F)^{-1} F^t W^t Z.$$

It is known that the air speed of the system corresponds to the speed of a particle passing through the focal point of the laser beam. It is therefore necessary to find the Doppler frequency which corresponds to the frequency of a particle passing the focal point, therefore for which $z = a + bf_d = 0$. This Doppler frequency therefore has the value $f_d = -a/b$ in which a and b are the coefficients of the vector $\hat{X}$. Finally, the air speed is computed from the Doppler frequency by relationships known to the person skilled in the art.

The measurements performed for each laser beam make it possible to determine the projection of the speed vector along each of the corresponding axes. The modulus TAS and the angles AOA and SSA (TAS, true air speed, is the modulus of the air speed vector, AoA standing for angle of attack and SSA standing for side slip angle define its orientation. If the air speed vector is considered to be defined in Cartesian coordinates by its 3 components Vx, Vy, Vz in a coordinate system linked to the carrier where, by convention, the axis x points forwards, y to the right and z downwards, then $TAS = \sqrt{V_X^2 + V_Y^2 + V_Z^2}$, $$AOA = \arctan\left(\frac{V_Z}{V_X}\right), SSA = \arctan\left(\cos AOA \cdot \frac{V_Y}{V_X}\right)$$

defining the air speed vector are deduced therefrom through an algorithm of least squares type.

In the case of the use of the parametric model $z = a + bf_d + cf_d^2$

In this variant, a term is added in the parametric model between z and $f_d$. This term is used to model the fact that the speed gradient is not constant (the profile of slope as a function of frequency is dissymmetrical).

The linear regression is then carried out by using the following matrix relationship:

$$Z = F_1 \cdot X$$

$$\text{in which } Z = \begin{bmatrix} z_1 \\ z_2 \\ \vdots \\ z_N \end{bmatrix}, F_1 = \begin{bmatrix} 1 & f_1 & f_1^2 \\ 1 & f_2 & f_2^2 \\ \vdots & \vdots & \vdots \\ 1 & f_N & f_N^2 \end{bmatrix} \text{ and } X = [\,a \; b \; c\,].$$

The estimation of the value of the vector X is obtained by a linear regression carried out over N spots. The weighted least squares method is used and, to avoid giving too much weight to the noise-affected values, the matrix W is introduced:

$$W = \begin{bmatrix} r_1 & 0 & \ldots & 0 \\ 0 & r_2 & 0 & \vdots \\ \vdots & 0 & \ldots & 0 \\ 0 & \vdots & 0 & r_N \end{bmatrix}$$

By using the weighted least squares method, it is then found that the estimation of the vector X is:

$$\hat{X} = (F_1^t W^t W F_1)^{-1} F_1^t W^t Z.$$

The parameters a, b and c correspond to the coefficients of the vector $\hat{X}$. The Doppler frequency then corresponds to the frequency for which the particle passes the focal point, therefore for which $z = a + bf_d + cf_d^2 = 0$. This Doppler frequency $f_d$ is that of the two roots of the second degree equation $a + bf_d + cf_d^2 = 0$ in which a, b and c are the coefficients of the vector $\hat{X}$ which belongs to the frequency domain delimited by the extreme values of the discrete set $(f_1, \ldots, f_N)$ (this set is therefore the Doppler frequencies of the N spots cited previously). Finally, the air speed is computed from the Doppler frequency by relationships known to the person skilled in the art.

In the case of the use of the parametric model $f_d = \alpha + \beta z + \gamma z^2$ In this variant, the linear regression is then carried out by using the following matrix relationship:

$$F_2 = Z \cdot X$$

$$\text{in which } F_2 = \begin{bmatrix} f_1 \\ f_2 \\ \vdots \\ f_N \end{bmatrix}, Z = \begin{bmatrix} 1 & z_1 & z_1^2 \\ 1 & z_2 & z_2^2 \\ \vdots & \vdots & \vdots \\ 1 & z_N & z_N^2 \end{bmatrix} \text{ and } X = [\,\alpha \; \beta \; \gamma\,]$$

The estimation of the value of the vector X is obtained by linear regression which is therefore carried out over N spots. The weighted least squares method is used and, to avoid giving too much weight to the noise-affected values, the matrix W is introduced:

$$W = \begin{bmatrix} r_1 & 0 & \ldots & 0 \\ 0 & r_2 & 0 & \vdots \\ \vdots & 0 & \ldots & 0 \\ 0 & \ldots & 0 & r_N \end{bmatrix}$$

By using the weighted least squares method, it is then found that the estimation of the vector X is:

$$\hat{X} = (Z^t W^t W Z)^{-1} Z^t W^t F_2.$$

The parameters $\alpha$, $\beta$ and $\gamma$ correspond to the coefficients of the vector $\hat{X}$. The Doppler frequency then corresponds to the frequency for which the particle passes the focal point, therefore for which $z = 0$. This Doppler frequency is therefore $f_d = \alpha$. Finally, the air speed is computed from the Doppler frequency by relationships known to the person skilled in the art.

These different modules can be produced on one or more generic processors coupled to memory making it possible to save the intermediate data, but also on dedicated processors, programmable logic arrays of FPGA or PLD type, or any other type of device making it possible to perform the determinations described, the different modules being able to share the computation and memory resources.

FIG. 7 presents another embodiment of the module for determining the air speed 107 in which the linear regression submodule 302 present in FIG. 3 is replaced by a correlation submodule 401.

In a first variant, the submodule 401 for determining parameters by correlation uses the theoretical relationship linking the slope and the point of intersection of the particle and of the laser beam z, as defined in the following equation:

$$\rho = -\frac{2 \cdot V_{trans}^2}{\lambda \cdot z \cdot \left[1 + \left(\frac{z_R}{z}\right)^2\right]} = V_{trans}^2 g(z).$$

In this relationship, ρ represents the slope of the spot, z the distance between the focal point of the incident beam and the point at which the particle intersects the incident beam, λ is a parameter of the system, $V_{trans}$ is the projection of the speed of the particle considered in the plane orthogonal to the axis of the laser beam.

This submodule also uses a parametric model representing the relationship between z, the distance between the focal point of the incident beam and the point at which the particle intersects the incident beam, and $f_d$, the Doppler frequency of a beam backscattered by the particle. The parametric model is, for example:

$$z = a + b f_d + c f_d^2.$$

The correlation method will make it possible to compute the parameters a, b and c of this parametric model. The following matrix relationship is defined:

$$Z = G \cdot X$$

in which $Z = \begin{bmatrix} \rho_1 \\ \rho_2 \\ \vdots \\ \rho_N \end{bmatrix}, G = \begin{bmatrix} g(z_1) \\ g(z_2) \\ \vdots \\ g(z_N) \end{bmatrix}$ and $X = [V_{trans}^2]$.

The estimation of the vector X is then defined by the equation:

$$\hat{X} = G^* Z$$

in which:

$$G^* = (G^t G)^{-1} G^t.$$

The likelihood criterion is then defined as the sums of the residues squared between Z and $G\hat{X}$:

$$\Phi(a,b,c) = \|Z - G\hat{X}\|^2 = \|(Id - GG^*)Z\|^2.$$

We then seek to minimize this likelihood criterion. By development, the following is obtained:

$$\Phi(a,b,c) = \|Z\|^2 - \Phi'(a,b,c)$$

with:

$$\Phi'(a,b,c) = (G^t Z)^t (G^t G)^{-1} (G^t Z).$$

It is therefore possible either to search for the value of the triplet (a,b,c) which minimizes Φ(a,b,c) or else the values which maximize Φ'(a,b,c). Different methods are known to the person skilled in the art such as, for example, the gradient method which makes it possible to rapidly converge towards a local minimum in the three-dimensional space (a,b,c). It is also possible to perform a systematic scan of an area of the space thought to contain the minimum, possibly complemented by the gradient method to refine the search.

The Doppler frequency then corresponds to the frequency for which the particle passes the focal point, therefore for which $a + b f_d + c f_2^2 = 0$. Knowing the value of a,b,c, it is possible to find the value of the roots of the following second degree equation $a + b f_d + c f_d^2 = 0$. The Doppler frequency then corresponds to the root which belongs to the frequency domain delimited by the extreme values of the discrete set $(f_1, \ldots, f_N)$ (this set is therefore the Doppler frequencies of the N spots cited previously). Finally, the air speed is computed from the Doppler frequency by relationships known to the person skilled in the art.

In a second variant, this correlation module can also compute the parameters a, b and c, such that the set of the points $(\rho_i, f_i)$ representing the average of the frequency and of the slope of the different spots is as close as possible to a theoretical curve of equation:

$$\rho = -\frac{2 \cdot V_{trans}^2}{\lambda \cdot (a + b \cdot f + c \cdot f^2) \cdot \left[1 + \left(\frac{z_R}{a + b \cdot f + c \cdot f^2}\right)^2\right]} = V_{trans}^2 \cdot h(f).$$

As in the preceding case, the least squares method is applied. The following matrix relationship is defined:

$$Z = H \cdot X$$

in which $Z = \begin{bmatrix} \rho_1 \\ \rho_2 \\ \vdots \\ \rho_N \end{bmatrix}, H = \begin{bmatrix} h(f_1) \\ h(f_2) \\ \vdots \\ h(f_N) \end{bmatrix}$ and $X = [V_{trans}^2]$.

This amounts to the same problem as the first variant because $h(f_i) = g(z_i)$.

In a third variant, the submodule 401 for determining parameters by correlation uses the theoretical relationship linking the frequency variation Δf and the coordinate z of the point of intersection of the particle and of the laser beam, as defined in the following equation:

$$\Delta f = slope \cdot duration = \frac{4 \cdot \omega_0 \cdot V_{trans}}{\lambda \cdot z_R \cdot \sqrt{1 + \left(\frac{z_R}{z_0}\right)^2}} = V_{trans} g(z).$$

In this relationship Δf represents the frequency variation of the spot, z the distance between the focal point of the incident beam and the point at which the particle intersects the incident beam, λ is a parameter of the system, $V_{trans}$ is the projection of the speed of the particle considered in the plane orthogonal to the axis of the laser beam and $z_R$ is a parameter of the system.

This submodule also uses a parametric model representing the relationship between z, the distance between the focal point of the incident beam and the point at which the particle intersects the incident beam, and $f_d$, the Doppler frequency of a beam backscattered by the particle. The parametric model is, for example:

$$z = a + b f_d + c f_d^2.$$

The correlation method will make it possible to compute the parameters a, b and c of this parametric model. The following matrix relationship is defined:

$$Z = G \cdot X$$

in which $Z = \begin{bmatrix} \rho_1 \\ \rho_2 \\ \vdots \\ \rho_N \end{bmatrix}, G = \begin{bmatrix} g(z_1) \\ g(z_2) \\ \vdots \\ g(z_N) \end{bmatrix}$ and $X = [V_{trans}^2]$.

The estimation of the vector X is then defined by the equation:

$$\hat{X} = G^* Z$$

in which:

$$G^* = (G^t G)^{-1} G^t.$$

The likelihood criterion is then defined as the sums of the residues squared between Z and $G\hat{X}$:

$$\Phi(a,b,c) = \|Z - G\hat{X}\|^2 = \|(Id - GG^*)Z\|^2.$$

We then seek to minimize this likelihood criterion. By development, the following is obtained:

$$\Phi(a,b,c) = \|Z\|^2 - \Phi'(a,b,c)$$

with:

$$\Phi'(a,b,c) = (G^t Z)^t (G^t G)^{-1} (G^t Z).$$

It is therefore possible either to search for the value of the triplet (a,b,c) which minimizes $\Phi(a,b,c)$ or else the values which maximize $\Phi'(a,b,c)$. Different methods are known to the person skilled in the art such as, for example, the gradient method which makes it possible to converge rapidly towards a local minimum in the three-dimensional space (a,b,c). It is also possible to perform a systematic scan of an area of the space thought to contain the minimum, possibly complemented by the gradient method to refine the search.

The parameters a, b and c correspond to the coefficients of the vector $\hat{X}$. The Doppler frequency then corresponds to the frequency for which the particle passes the focal point, therefore for which $a + b f_d + c f_d^2 = 0$. Knowing the value of a, b and c, it is possible to find the value of the roots of the following second degree equation $0 = a + b f_d + c f_d^2$. The Doppler frequency then corresponds to the smallest, the greatest, the most . . . root of said second degree equation. Finally, the air speed is computed from the Doppler frequency by relationships known to the person skilled in the art.

In a fourth variant, this correlation module can also compute the parameters a, b and c, such that the set of the points $(\Delta f_i, f_i)$ representing the average of the frequency and of the slope of the different spots is as close as possible to a theoretical curve of equation:

$$\Delta f = \text{slope} \cdot \text{duration} = \frac{4 \cdot \omega_0 \cdot V_{trans}}{\lambda \cdot z_R \cdot \left[1 + \left(\frac{z_R}{z_0}\right)^2\right]} = V_{trans} h(f).$$

As in the preceding case, the least squares method is applied. The following matrix relationship is defined:

$$Z = H \cdot X$$

$$\text{in which } Z = \begin{bmatrix} \rho_1 \\ \rho_2 \\ \vdots \\ \rho_N \end{bmatrix}, H = \begin{bmatrix} h(f_1) \\ h(f_2) \\ \vdots \\ h(f_N) \end{bmatrix} \text{ and } X = [V_{trans}^2].$$

This amounts to the same problem as the third variant because $h(f_i) = g(z_i)$.

These different modules can be produced on one or more generic processors coupled to memory making it possible to save the intermediate data, but also on dedicated processors, programmable logic arrays of FPGA or PLD type, or any other type of device making it possible to perform the determinations described, the different modules being able to share the computation and memory resources.

The invention claimed is:

1. Laser anemometry system comprising: a set of at least one coherent laser source supplying an incident beam, said beam being backscattered by a set of particles passing through said incident beam;
   mixing means, respectively associated with a laser source, for mixing said backscattered beam and a reference beam, said reference beam being the duplication of said incident beam, creating an interferometry wave;
   conversion means, respectively associated with a laser source, converting said wave into an electrical signal, the instantaneous intensity of which is proportional to the instantaneous power of said wave;
   first determination means, respectively associated with a laser source, for determining a time-frequency diagram of said electrical signal;
   characterized in that it also comprises
   second determination means, respectively associated with a laser source, for determining spots of said diagram, each spot being a set of connected points of said diagram, having exceeded a detection threshold;
   computation means, respectively associated with a laser source, for computing an average of the frequency, a duration and a slope characterizing the trend of the frequency as a function of time in the time-frequency diagram, respectively associated with a spot third determination means for determining the air speed from all or part of said averages of the frequency, of said durations and of said slopes, said third determination means also being suitable for computing a Doppler frequency, said Doppler frequency being the average of all or part of said averages of the frequency respectively associated with spots for which one of the following conditions is met;
   said duration is less than a first duration threshold;
   the multiplication of said duration by said slope is less than a second threshold; and
   said multiplication of said slope by the square of said duration is less than a third threshold.

2. The laser anemometry system of claim 1, in which the third determination means for determining the air speed are suitable for determining parameters of a theoretical curve, such that the points of a graph, of which the first axis represents a frequency and the second axis represents either a slope or a frequency variation, and containing a set of points, each point being respectively associated with one of said spots and each point having as coordinates, according to the first and the second axis respectively, the average of the frequency and the slope or the frequency variation of said spot, converge the most with said curve and the determination of a Doppler frequency, said Doppler frequency corresponding to a singularity on said theoretical curve.

3. The laser anemometry system of claim 2, in which the third determination means for determining the air speed are suitable for determining said parameters through the use of a linear regression from said graph.

4. The laser anemometry system of claim 3, in which said computation means are suitable for using the following relationships:

$$P_b(f,t) = \frac{P_u(f,t)}{\iint\limits_{spot} P_u(f,t) \, f \, t \, df \, dt}$$

-continued $$m_t = \int\int_{spot} P_u(f,t)\, t\, df\, dt$$

$$m_f = \int\int_{spot} P_u(f,t)\, f\, df\, dt$$

$$\sigma_t^2 = \int\int_{spot} P_u(f,t)\, t^2\, df\, dt - m_t^2$$

$$\rho_{t,f} = \int\int_{spot} P_u(f,t)\, t\, f\, df\, dt - m_t m_f$$

$$\text{slope} = \frac{\rho_{t,f}}{\sigma_t^2}$$

$$\text{duration} = 4\sqrt{2}\,\sigma_t$$

in which spot is the set of points of one of said spots, $P_u(f,t)$ is the value of the time-frequency graph for the frequency f and the time t, $m_f$ is the average of the frequency of said spot, slope is the slope of said spot and duration is the duration of said spot.

5. The laser anemometry system of claim 3, in which said computation means are suitable for determining the slope of one of said spots by using a linear regression on said spot.

6. The laser anemometry system of claim 2, in which the third determination means for determining the air speed are suitable for determining said parameters through the use of a correlation between said theoretical curve and said graph.

7. The laser anemometry system of claim 6, in which said computation means are suitable for determining the slope of one of said spots by using a linear regression on said spot.

8. The laser anemometry system of claim 2, in which said computation means are suitable for using the following relationships:

$$P_b(f,t) = \frac{P_u(f,t)}{\int\int_{spot} P_u(f,t)\, f\, t\, df\, dt}$$

$$m_t = \int\int_{spot} P_u(f,t)\, t\, df\, dt$$

$$m_f = \int\int_{spot} P_u(f,t)\, f\, df\, dt$$

$$\sigma_t^2 = \int\int_{spot} P_u(f,t)\, t^2\, df\, dt - m_t^2$$

$$\rho_{t,f} = \int\int_{spot} P_u(f,t)\, t\, f\, df\, dt - m_t m_f$$

$$\text{slope} = \frac{\rho_{t,f}}{\sigma_t^2}$$

$$\text{duration} = 4\sqrt{2}\,\sigma_t$$

in which spot is the set of points of one of said spots, $P_u(f,t)$ is the value of the time-frequency graph for the frequency f and the time t, $m_f$ is the average of the frequency of said spot, slope is the slope of said spot and duration is the duration of said spot.

9. The laser anemometry system of claim 2, in which said computation means are suitable for using the following relationships:

$$P_b(f,t) = \frac{P_u(f,t)}{\int\int_{spot} P_u(f,t)\, f\, t\, df\, dt}$$

$$m_t = \int\int_{spot} P_u(f,t)\, t\, df\, dt$$

$$m_f = \int\int_{spot} P_u(f,t)\, f\, df\, dt$$

$$\sigma_t^2 = \int\int_{spot} P_u(f,t)\, t^2\, df\, dt - m_t^2$$

$$\rho_{t,f} = \int\int_{spot} P_u(f,t)\, t\, f\, df\, dt - m_t m_f$$

$$\text{slope} = \frac{\rho_{t,f}}{\sigma_t^2}$$

$$\text{duration} = 4\sqrt{2}\,\sigma_t$$

in which spot is the set of points of one of said spots, $P_u(f,t)$ is the value of the time-frequency graph for the frequency f and the time t, $m_f$ is the average of the frequency of said spot, slope is the slope of said spot and duration is the duration of said spot.

10. The laser anemometry system of claim 2, in which said computation means are suitable for determining the slope of one of said spots by using a linear regression on said spot.

11. The laser anemometry system of claim 1, in which said computation means are suitable for using the following relationships:

$$P_b(f,t) = \frac{P_u(f,t)}{\int\int_{spot} P_u(f,t)\, f\, t\, df\, dt}$$

$$m_t = \int\int_{spot} P_u(f,t)\, t\, df\, dt$$

$$m_f = \int\int_{spot} P_u(f,t)\, f\, df\, dt$$

$$\sigma_t^2 = \int\int_{spot} P_u(f,t)\, t^2\, df\, dt - m_t^2$$

$$\rho_{t,f} = \int\int_{spot} P_u(f,t)\, t\, f\, df\, dt - m_t m_f$$

$$\text{slope} = \frac{\rho_{t,f}}{\sigma_t^2}$$

$$\text{duration} = 4\sqrt{2}\,\sigma_t$$

in which spot is the set of points of one of said spots, $P_u(f,t)$ is the value of the time-frequency graph for the frequency f and the time t, $m_f$ is the average of the frequency of said spot, slope is the slope of said spot and duration is the duration of said spot.

12. The laser anemometry system of claim 11, in which said computation means are suitable for determining the slope of one of said spots by using a linear regression on said spot.

13. The laser anemometry system of claim 1, in which said computation means are suitable for determining the slope of one of said spots by using a linear regression on said spot.

14. Laser anemometry method comprising the following steps:
- a step of transmission of an incident beam by at least one coherent laser source, said beam being backscattered by a set of particles passing through said incident beam;
- a mixing step, respectively associated with a laser source, for mixing said backscattered beam and a reference beam, said reference beam being the duplication of said incident beam, creating an interferometry wave;
- a conversion step, respectively associated with a laser source, converting said wave into an electrical signal, the instantaneous intensity of which is proportional to the instantaneous power of said wave;
- a first determination step, respectively associated with a laser source, for determining a time-frequency diagram of said electrical signal;

characterized in that it also comprises:
- a second determination step, respectively associated with a laser source, for determining spots of said diagram, each spot being a set of connected points of said diagram, that have exceeded a detection threshold;
- a computation step, respectively associated with a laser source, for computing an average of the frequency, a duration and a slope characterizing the trend of the frequency as a function of time in the time-frequency diagram, respectively associated with a spot;
- a third determination step for determining the air speed from all or part of said averages of the frequency, of said durations and of said slopes, said third determination step also being suitable for computing a Doppler frequency, said Doppler frequency being the average of all or part of said averages of the frequency respectively associated with spots for which one of the following conditions is met:

said slope is less than a first slope threshold;

the multiplication of said duration by said slope is less than a second threshold; or said multiplication of said slope by the square of said duration is less than a third threshold.

* * * * *